United States Patent
Han et al.

(10) Patent No.: US 6,416,796 B1
(45) Date of Patent: *Jul. 9, 2002

(54) WHEY PROTEIN DIGESTION PRODUCTS IN CHEESE

(75) Inventors: Xiao-Qing Han, Glenview, IL (US); Joseph E. Spradlin, Hot Springs, AR (US)

(73) Assignee: Kraft Foods, Inc., Northfield, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,714

(22) Filed: Apr. 27, 1999

(51) Int. Cl.[7] .................. A23C 19/032; A23C 21/02
(52) U.S. Cl. .................. 426/36; 426/41; 426/42
(58) Field of Search .................. 426/36, 38, 41, 426/42, 582, 583

(56) References Cited

U.S. PATENT DOCUMENTS

| | | | |
|---|---|---|---|
| 2,793,122 A | 5/1957 | Erekson | 99/116 |
| 3,535,304 A | 10/1970 | Muller et al. | 99/2 |
| 4,205,090 A | 5/1980 | Maubois et al. | 426/40 |
| 4,379,170 A | 4/1983 | Hettinga et al. | 426/40 |
| 4,500,549 A | 2/1985 | Crossman | 426/33 |
| 4,707,364 A | 11/1987 | Barach et al. | 426/36 |
| 4,919,943 A | 4/1990 | Yee et al. | 426/39 |
| 5,356,639 A | 10/1994 | Jameson et al. | 426/40 |
| 5,523,237 A | 6/1996 | Budtz et al. | 435/68.1 |
| 5,691,165 A | 11/1997 | Nielson et al. | 435/68.1 |
| 5,800,849 A * | 9/1998 | Budtz et al. | 426/36 |

FOREIGN PATENT DOCUMENTS

| | | | |
|---|---|---|---|
| DE | 247 832 A1 | 7/1987 | A23C/19/05 |
| FR | 2 138 125 A | 12/1972 | A23C/9/00 |
| WO | WO 91/13553 | 9/1991 | A23C/19/032 |
| WO | WO98/03073 | 1/1998 | A23C/19/06 |

OTHER PUBLICATIONS

Banks, Jean M., "Improving cheese yield by the incorporation of whey powder", *Dairy Ind. Int.*, vol. 55, pp. 37–41, Apr. 1990.

Kosilowski, Cheese and Fermented Foods, 2$^{nd}$ ed., Edwards Brothers, Inc., Ann Arbor, MI, Jan. 1977, pp. 451–458.

Ernstrom et al., *Journal of Dairy Sciences*, vol. 63, issued Feb. 1980, pp. 2298–2340.

Harper et al., "Effects of Whey Protein on the Proteolysis of Cheddar Cheese Slurries (A model for the maturation of Cheeses Made from Ultrafiltered Milk", *Journal of Dairy Sciences*, vol. 49, pp. 333–341, Feb. 1989.

Banks et al., "Increasing the Yield of Cheddar Cheese by the Acidification of Milk Containing Heat–Denatured Whey Protein", *Michenwissenschaft*, vol. 42, issued Apr. 1987, pp. 212–215.

Law et al., "Denaturation of the Whey Proteins in Heated Milk and Their Incorporation into Cheddar Cheese", *Michenwissenschaft*, vol. 49, issued Feb. 1994, pp. 63–67.

Dybing et al., "The Ability of Phosphates or Heated Milk to Coagulate Whey Proteins and Their Incorporation into Cheddar Cheese", *Journal of Dairy Sciences*, vol. 81, issued Feb. 1994, pp. 63–67.

Guinee et al., "Composition, Manufacture and Maturation of Semi–Hard Cheeses from High Protein Ultrafiltered Milk Retentates with Different Levels of Denatured Whey Protein", *International Dairy Journal*, vol. 5, issued May 1995, pp. 543–568.

* cited by examiner

*Primary Examiner*—Keith Hendricks
(74) *Attorney, Agent, or Firm*—Fitch, Even, Tabin & Flannery

(57) ABSTRACT

The invention provides a dairy composition containing a complex of a casein-complexing whey protein digestion product and casein micelles, and methods for their preparation. Also provided are the digestion product and methods for its preparation. The digestion product is provided by the action of a non-rennet protease on whey protein, such that the digestion product remains with the curds when a composition including the complex is subjected to a renneting process that provides curds and a supernatant. The resulting curds also include casein degradation products. The non-rennet protease is the bacterial protease Novo SP 446. The invention additionally provides a cheese composition and a cheese product obtained by renneting a dairy composition containing the casein-complexing whey protein digestion product described herein and casein micelles. The resulting cheese composition includes whey protein digestion products and casein degradation products. Methods of preparing the cheese composition and the cheese product are also provided. Additionally, the casein-complexing whey protein digestion product may be added directly to a cheese substance such as a processed cheese, a cottage cheese, and a cream cheese to provide a cheese product.

4 Claims, 1 Drawing Sheet

WHEY PROTEIN DIGESTION PRODUCTS IN CHEESE

FIELD OF THE INVENTION

This invention relates to cheese compositions containing enzymatically modified whey protein digestion products. The resulting compositions have advantageous flavoring and more optimal utilization of dairy components in the manufacture of cheese compositions.

BACKGROUND OF THE INVENTION

Cheese compositions are prepared from dairy liquids by processes that include treating the liquid with a coagulating or clotting agent. The coagulating agent may be a curding enzyme, an acid, or a suitable bacterial culture, or it may include such a culture. The coagulum or curd that results generally incorporates transformed casein, fats including natural butter fat, and flavorings that arise especially when a bacterial culture is used. The curd may be separated from the liquid whey, which contains soluble proteins not affected by the coagulation and that therefore are not incorporated into the coagulum. Whey is thus a byproduct of manufacturing and commercial processes that produce food products such as cheeses. Whey contains soluble substances such as lactose, and proteins such as β-lactoglobulin, α-lactalbumin, bovine serum albumin, immunological proteins and trace amounts of free caseins. Since large quantities of whey are available from the side streams of the food producing processes mentioned above, it would be desirable to more fully optimize utilization of the components of whey in the manufacture of dairy products in order to increase the utilization of the raw milk starting material and thereby enhance overall efficiency. The inability of whey proteins to be retained in the coagulum is an important factor contributing to a lack of efficiency in the conventional production of cheese curds, and to a reduction in overall yield relating to the incorporation of all the protein solids that are present in the starting dairy liquids into resulting cheese curds. These problems have been recognized for many decades.

Several methods have been proposed with the objective of recovering whey proteins in cheese products. For example, whey proteins have been concentrated or dried from whey, and then recombined with cheese (see Kosikowski, Cheese and Fermented Foods, 2nd ed., Edwards Brothers, Inc., Ann Arbor, Mich., 1977, pp. 451–458). Unfortunately, in such procedures the recovered whey constituents do not have the appropriate physical and chemical properties conducive to making natural cheeses or process cheeses. An alternative approach has been to coprecipitate whey proteins with casein, as disclosed, for example, in U.S. Pat. No. 3,535,304. Again, however, the final product of this process lacks the proper attributes for making processed and/or imitation cheeses.

A further attempt to incorporate whey proteins into cheese products has employed ultrafiltration of milk to concentrate components, such as casein, whey protein, and butterfat, that do not permeate the ultrafiltration membrane. When such a composition is coagulated by contact with an acid or rennet, a curd forms. This curd, however, loses considerable quantities of the whey protein during compaction. For example, U.S. Pat. No. 4,205,090 provides a process wherein the milk is concentrated to about one-fifth of its original volume. The resulting curd may be processed to provide soft cheeses such as Camembert or Roblechon, but not hard cheeses such as cheddar, Colby, and similar cheeses.

Ernstrom et al. (J. Dairy Science 63:2298–234 (1980)) provide a process in which milk is concentrated to about 20% of the original volume by ultrafiltration and evaporation; the lactose content are modulated by diafiltration. The resulting composition is then inoculated with a cheese starter, which also ferments the remaining lactose, and forms a cheese base. The cheese base can be used to replace natural cheese components of process cheese. This process does not employ any renneting agent or step to prepare a cheese curd.

There are difficulties associated with adding whey proteins in processes such as the manufacture of cheeses. For example, incorporation of whey protein into cheeses is associated with a deterioration in the taste and mouthfeel of the product, and furthermore tends to interfere with curding and subsequent processing of the product. This may occur, for example, if the whey protein is treated by heat denaturation, or by concentration prior to curding, or by complexation with destabilizing compounds. For example, Harper ei al. (J. Dairy Sci. 72:333–341 (1989)) discuss the art relating to such processes designed to increase product yield. Ultrafiltration of milk, for example, may concentrate all the macromolecular components entering into a cheese-making process. Nevertheless, although the yield is increased by virtue of the incorporation of whey protein, its presence could be responsible for a typical maturation in cheese processing, characterized by a lack of proteolysis and flavor development. Furthermore, according to Harper et al., the whey protein may be carried along in subsequent steps in cheese-making processes apparently undigested, if present in the native state, or it may be hydrolyzed to give products with unusual and often unpleasant flavors and textures if denatured by heat, shear, or foaming. According to Harper et al., such whey proteins, whether native or denatured, may alter the curding of casein proteins by dilution, or by specifically blocking the substrate from the enzymes, or by interfering with diffusion of the enzymes to the casein substrates. Harper et al. report decreased proteolysis of casein in the presence of whey protein by the action of chymosin. They also demonstrated that increased viscosity was not responsible for the observed effect.

U.S. Pat. No. 4,379,170 discloses a process for the manufacture of cheese and cheese-like products made by combining a non-hydrolyzed protein-fat-salt composition with hydrolyzed milk protein. The hydrolyzed milk protein composition is obtained by treating milk protein with a protease to hydrolyze the milk protein and to develop cheese flavor components. Additionally this portion, or a different portion of an edible protein, may be treated with a fermenting organism to develop cheese-like flavors. A non-hydrolyzed milk protein composition is obtained by removing water and fermentable sugars from milk. The non-hydrolyzed milk protein composition and the hydrolyzed milk protein composition are first mixed. After adding a culture and a coagulant to cause setting, the set mixture is broken to provide curd and whey. The curd is cooked and the whey is separated. In working examples, the protease employed is Rhozyme P-11™ (Rohm and Haas); the culture is Micrococcus sp. or *Propionibacteria*; and the coagulant is generally rennet.

U.S. Pat. No. 5,691,165 discloses a method of producing a whey protein hydrolyzate. The patent states that all prior art methods for producing a whey protein hydrolyzate yield products with an unacceptable taste. The method in U.S. Pat. No. 5,691,165 includes (1) forming a whey protein slurry of about 7–20%, (2) heating to above 60° C., preferably between 70° C. and 90° C., and adjusting the pH to about 8, (3) using at least two different proteases to hydrolyze the slurry to a degree of hydrolysis of between 15 and 35%, and (4) ultrafiltering the hydrolyzate to obtain whey protein hydrolyzate in the permeate. The proteases may preferably be obtained from *Bacillus licheniformis* (Alcalase™, identified in U.S. Pat. No. 5,523,237 (see below) as SP 446), and from *B. subtilis* (Neutrase™). In the examples, the resulting peptides are generally 3–5 residues in length.

U.S. Pat. No. 4,707,364 discloses a composition and process for accelerating the aging of cheese. Partially disrupted *Lactobacillus. casei* or *L. lactis* preserved by freeze drying; and dried lipase is used to treat milk or dairy compositions in cheese-making. These substances, and in certain embodiments, a protease from a microorganism such as *B. amyloliquefaciens, B. subtilis,* or *Aspergillus oryzae,* are added to the milk before the addition of the coagulant, or to the curd before pressing the whey. The accelerated curing advantageously reduces the time and space needed for storing the aging cheese.

U.S. Pat. No. 5,523,237 discloses a plastein material which is defined as one made by reversing the activity of an enzyme that is normally a protease acting on a proteinaceous material. The protease is a serine protease. The proteinaceous substrate is present at a concentration of 5–50%, and is preferably whey, casein, or soy protein. The enzyme preparation is substantially free of subtilisin A activity, and is a protease specific for glutamic acid and aspartic acid residues. The protease, designated SP446, is obtained from *Bacillus licheniformis*. Its proteolytic activity is characterized in considerable detail. Increased viscosity of whey protein as a result of the action of the enzyme is demonstrated.

Banks et al. (*Milchwissenschaft* 42:212–215 (1987)) disclose that heating milk at temperatures from 95° C. to 140° C. and then acidifying permits a modest increase in protein content in Cheddar cheese. A bitter off-flavor developed in this process. Law et al. (*Milchwissenschaft* 49:63–37 (1994)) report that heat treatment of milk prior to cheddaring results in reduction of proteins in whey or in acid filtrates of the milk.

Dybing et al. (*J. Dairy Sc.* 81:309–317 (1998)) provide a process for incorporating whey protein into cheese curd by concentrating the components, coagulating whey proteins using a variety of agents, and renneting a composition containing the coagulated whey protein and concentrated milk components. It was found, however, that these methods did not succeed in producing whey protein coagula that were recovered as cheese.

Guinee et al. (*Int. Dairy Journal* 5:543–568 (1995)) recently evaluated the state of the art for incorporating whey protein into cheese. High-heat treatment of milk is reported to impair rennet coagulation, curd syneresis, curd structure and texture, and functional properties such as meltability and stretchability. Guinee et al. discuss physical and chemical factors that may be responsible for these effects. Using heat treatments that denature whey protein in milk compositions, they prepared semi-hard cheeses that result from curding such treated compositions. They found that the curd obtained in this way has high whey protein levels, but also high moisture level, low pH value, poor curd fusion and low yield (fracture) values during ripening.

As may be seen from the results summarized above, there still remains in the dairy industry the long-felt need to optimize the utilization of components present in byproducts and side stream in the manufacture of dairy products while maintaining organoleptic and other desirable properties. Such optimization would result in increased efficiency, higher yields of dairy products, and reduced overall material costs. In particular, there remains a need to optimize the incorporation of whey protein into cheese products. Prior art methods addressing this problem generally resulted in disagreeable taste, poor physical and organoleptic properties, and interfered with curd formation. The present invention addresses these needs and provides advantageous solutions to them.

SUMMARY OF THE INVENTION

The present invention provides a whey protein digestion product that results from the action of a non-rennet protease on whey protein, and methods for its production. The digestion product forms a complex with casein micelles, and enables the digestion product to remain with the curds after subjecting the complex to a renneting procedure. Furthermore, the curds that result on renneting the complex include casein degradation products. The non-rennet protease is chosen from among a microbial protease, a protease from plant origins, or a protease from animal or marine fish sources. Preferably, the protease is a glutamyl endopeptidase (SP 446) obtained from *Bacillus licheniformis* (Novo Nordisk).

The invention also provides a dairy composition containing a complex of a whey protein digestion product and casein micelles, and methods of making the dairy composition. The digestion product is provided by the action of a non-rennet protease on whey protein, such that at least a portion of the digestion product remains with the curds after a composition, including the complex, is subjected to a renneting process that provides curds and a supernatant. The resulting curds also include casein degradation products. The non-rennet protease is chosen from among a microbial protease, a protease from plant origins, or a protease from animal or marine fish sources. Preferably, the protease is a glutamyl endopeptidase (SP 446) obtained from *Bacillus licheniformis* (Novo Nordisk).

The invention additionally provides a cheese composition or a cheese product obtained by renneting a dairy composition containing the casein-complexing whey protein digestion product described herein and casein micelles, and methods of making the cheese composition. The resulting cheese composition includes whey protein digestion products and casein degradation products.

In general, the processes employed to produce the whey protein digestion product of the invention include the steps of
  (i) providing a composition comprising whey protein,
  (ii) contacting the composition with a non-rennet protease under conditions that, and for a time sufficient to, provide a casein-complexing whey protein digestion product.

In addition, the processes employed to produce the cheese compositions and cheese products of the invention include the steps of
  (i) providing a first composition comprising whey protein,
  (ii) contacting the first composition with a non-rennet protease under conditions that, and for a time sufficient to, provide a casein-complexing whey protein digestion product,
  (iii) contacting the digestion product with a second composition that includes casein micelles to provide a complex of the digestion product and the casein micelles, and
  (iv) renneting the complex, thereby providing the cheese composition or cheese product. In important embodiments of these methods, the conditions used in step (ii)

include a temperature in the range from about 30° C. to about 70° C. The non-rennet protease is chosen from among a microbial protease, a protease from plant origins, or a protease from animal or marine fish sources. Preferably, the protease is a glutamyl endopeptidase (SP 446) obtained from *Bacillus licheniformis* (Novo Nordisk). In an additional embodiment, the second composition also includes whey protein. In a further advantageous embodiment of the methods, the renneting of step (iv) also produces a whey supernatant containing whey protein. This supernatant may be recycled by using the whey supernatant as at least a portion of the first composition described in steps (i) and (ii).

The invention further provides a cheese product obtained by adding the casein-complexing whey protein digestion product described in this invention to a cheese substance, such as, for example; processed cheese, cottage cheese, or cream cheese.

DETAILED DESCRIPTION OF THE INVENTION

Figure 1:
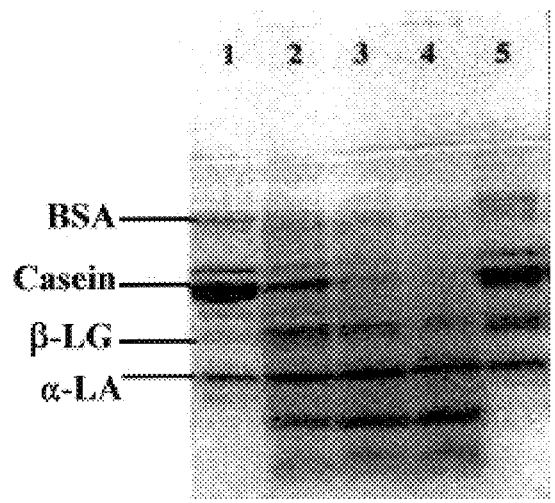
FIG. 1 provides a tricine SDS PAGE of the proteins incorporated into cheese curds. Lane 1, the curd produced by the experiment of Table 1, line 1 (cheddar control); lane 2, the curd produced by the experiment of Table 1, line 4 (whey protein+2 µL SP 446); lane 3, the curd produced by the experiment of Table 1, line 6 (whey protein+5 µL SP 446); lane 4, the curd produced by the experiment of Table 1, line 7 (whey protein+10 µL SP 446); and lane 5, the curd produced by the experiment of Table 1, line 3 (control; whey protein+0 µL SP 446).

The present invention provides compositions, and methods of preparing and using them, that offer improved utilization of components present as whey proteins in dairy byproducts and/or side streams. The invention employs a whey protein digestion product obtained by the action of a non-rennet protease on whey protein. The digestion product forms a complex with casein micelles, such that, when subjected to the action of a renneting process, at least a portion of the digestion product remains with the curds. The curd product finally obtained, such as a cheese, is essentially unaltered in its physical properties, permitting conventional processing. Moreover, it contains no off-flavors or undesired taste components such as those known to occur when undigested whey protein is incorporated in a curd. Furthermore, the cheese curd resulting from the process of the present invention includes casein degradation products in addition to whey protein digestion products. The compositions and methods disclosed herein result in increased efficiency, higher yields of dairy products, and reduced overall material costs, and permit more effective utilization of whey protein in cheese compositions than is currently known in the cheese-making art.

As used herein, "whey protein" relates to the proteins contained in a dairy liquid obtained as a supernatant of the curds when milk or a product containing milk components are curded to produce a semisolid cheese-making curd. Whey protein is generally understood to include principally the globular proteins β-lactoglobulin and α-lactalbumin; it also includes a significantly lower concentration of immunoglobulin and other globmins and proteins. The whey employed in the invention may be natural whey liquid directly provided by a cheese-making process. It may additionally be a whey concentrate obtained by processes known to the skilled artisan in dairy chemistry such as ultrafiltration. The whey furthermore may be a reconstituted liquid obtained by adding water or an aqueous composition to whey solids, wherein the reconstituted concentration may be lower than, about equal to, or greater than the concentration of natural whey. All these whey preparations include whey protein. In a further particular case, whey protein may be prepared by treating whey to lower the concentration of, or eliminate, low molecular weight components of whey, such as lactose, by methods known in the dairy arts, including ultrafiltration (with or without diafiltration). In general, therefore, preparations of whey protein that may be used in the present invention contain whey protein, either alone or together with other components of whey, and at a broad range of concentrations.

As used herein, the term "whey protein digestion product" and equivalent abbreviated or synonymous versions of this term (for example, "digestion product") relate to the proteolytic digestion product obtained upon treatment of whey protein by a non-rennet protease. As disclosed above, whey protein contains a number of protein components. When acted upon by the protease according to the methods described herein, a broad range of peptide products will in general result. These peptides have varying degrees of hydrophilicity, hydrophobicity, and ionic charge. This assemblage of peptides constitutes the whey protein digestion product.

The whey protein digestion product is combined in the present invention with a composition that includes casein micelles. As used herein, such a composition relates to milk, or to a milk product obtained by fractionating raw milk to provide a liquid fraction, or a solid milk fraction that is reconstituted to a liquid. The minimum requirements for this composition are that it includes casein in the form of aggregates, or micelles, and that the composition coagulates to a cheese curd when subjected to rennet. In general, milk also contains whey proteins in addition to casein. The milk may be treated to remove some or all of the butterfat, providing low fat milk or skim milk, respectively. Furthermore, whole milk, low fat milk, or skim milk may be concentrated by methods such as evaporation, ultrafiltration and/or the like. Evaporation provides dairy compositions containing a higher concentration of the nonvolatile components; ultrafiltration provides dairy compositions with a higher concentration of the components that are nonpermeable to the ultrafiltration membrane. In any case, the dairy proteins including casein and any whey protein that may be present are included among the retained solids, such that their concentrations in the resulting liquids are increased. Furthermore, any of the above dairy compositions may be evaporated to dryness, providing milk solids originating from whole milk, low fat milk, or skim milk. Any of these solids may be reconstituted by the addition of water or a suitable aqueous composition including milk or a milk fraction. Reconstitution of dry milk thus provides dairy compositions that in general may have a broad range of final concentrations of the component proteins, butterfat, and other components. All the above liquids are included in the designation of "dairy compositions" as used herein.

The dairy compositions employed in the present invention may originate from any lactating livestock animal whose milk is useful as a source of human food. Such livestock animals include, by way of nonlimiting example, cows, buffalo, other ruminants, goats, sheep, and the like. In a preferred embodiment, cows' milk provides the dairy liquid used in the practice of the invention.

As used herein, "casein" relates to any, or all, of the phosphoproteins in milk. An important characteristic of casein is that it forms micelles in naturally occurring milk and in the dairy liquids employed in the present invention, and that clotting a dairy liquid containing casein by any suitable means provides a coagulated curd phase and a liquid whey phase that are separable from one another. Many casein components have been identified, including, but not limited to, α-casein (including $α_{s1}$-casein and $α_{s2}$-casein), β-casein, κ-casein, and their genetic variants, and mixtures thereof. As used herein, "casein micelles" relates to colloidal sized aggregates comprising the caseins present in milk, and to products containing casein micelles obtained from whole milk.

As used herein, "rennet" is a generic term used in the field of dairy science and in the field of cheese-making, to designate an activity obtained from the lining of the stomachs of immature mammals that consume maternal milk. The effect of treating a dairy composition with rennet is to clot the liquid, thereby forming a cheese curd and whey. The term "renneting" relates to the process of treating a dairy composition with rennet to provide a cheese curd and whey. Synonyms for "renneting" include, for example, terms such as "curding", "clotting", and "setting". As used in contemporary dairy science, "rennet" includes the enzyme earlier called "rennin" and now termed "chymosin". Chymosin is a member of the family of endopeptidases known as aspartyl proteases. Without wishing to be limited by theory, it is believed that the activity of rennet or chymosin on dairy liquids includes at least the proteolytic cleavage of the peptide bond between a phenylalanyl residue that occurs at about position 105 and a methionine that occurs at about position 106 in κ-casein to release a soluble macropeptide and induce the coagulation of the remainder of the molecule, termed para- κ-casein, with the components of the casein micelles.

Common natural sources of rennet or chymosin include, but are not limited to, the stomachs of calves, buffalo, other ruminants, kid goats, lambs, piglets and the like. Furthermore, various natural chymosins and genetically engineered mutant chymosins are available. Such recombinant protein products can be obtained by the introduction of genes encoding these proteins as heterologous genes in suitable host organisms. Chymosin is the activated form produced when the proenzyme prochymosin is activated. Prochymosin likewise may be a recombinant product, and may be a genetically engineered mutant protein which upon activation provides renneting activity. As used herein, all such chymosins having renneting activity, and prochymosins activatable to such chymosins, are included in the term "rennet".

Many other enzymes have coagulating activity but are not rennets. Nonlimiting examples include other aspartyl proteases such as various pepsins, and a large number of proteases from nonmammalian sources, including plants, other animals, marine fishes, and microorganisms. As used herein, a "non-rennet protease" relates to any such protease having renneting activity that is not a rennet as defined herein. Furthermore, various natural non-rennet proteases, as well as genetically engineered mutant proteins derived from natural proteases and having the corresponding protease activity, are available as recombinant protein products, obtained upon introducing genes encoding these proteins as heterologous genes in suitable host organisms. As used herein, the term "non-rennet protease" also includes all such recombinant non-rennet proteases having milk-clotting activity.

Among the non-rennet proteases that may be used in the present invention are a microbial protease, a protease from plant origins, or a protease from animal or marine fish sources. Examples of proteases that may be employed include the microbial proteases SP 446 (Novo Nordisk), Neutrase 1958 (Novo Nordisk), and Coralase PN-L (Rotim GmbH), and a plant protease such as papain. Preferably, the protease is the glutamyl endopeptidase (SP 446) obtained from *Bacillus licheniformis* (Novo Nordisk). The isolation and characterization of SP 446 is disclosed in U.S. Pat. No. 5,523,237, which is incorporated herein by reference. The temperature range in which the coagulation may be carried out is from about 20° C. to about 75° C., and more preferably is in the range from about 25° C. to about 55° C. The pH may be in the range from about 4.5 to about 10.0, and more preferably may be in the range from about 5.5 to about 9.0.

The duration of treatment is an important aspect of the invention, and is related in a complex way to the specific conditions of temperature and pH chosen from the broad ranges established herein. In general, the time of digestion may vary from about 10 min to about 300 min or longer. It is preferred to specify digestion conditions such that the digestion time is kept to a convenient duration, such as about 30 min to about 60 min. In general, the time required for digestion diminishes as the temperature of treatment and the enzyme dosage increases, and as the pH of the medium approaches optimal pH values for the enzyme. In general the compositions of the invention beneficially contain, and the methods of the invention advantageously produce, whey protein digestion products having molecular weights between about 2 kDa and about 10 kDa. These are conveniently determined by any method capable of providing apparent molecular weights of proteins and peptides, including, for example, size exclusion chromatography, gel permeation chromatography, and sodium dodecyl sulfate polyacrylamide gel electrophoresis. A convenient way to monitor the progress of proteolysis is to measure the amount of nonprecipitable peptides after treatment with trichloroacetic acid, such as a 3% solution thereof.

As used herein the term "casein-complexing" as applied to the whey protein digestion product relates to the attribute that at least a portion of the digestion product associates with casein micelles. As discussed above, the whey protein digestion product contains a broad range of peptide products. At least some of these are appropriately structured that a complex of the peptides with casein micelles results. The association of the components of the complex maV be noncovalent or covalent. A component in the digestion product is considered to participate in a complex if it is not found in the whey after the complex is subjected to renneting.

As shown herein, whey protein, when treated by certain proteases under carefully controlled conditions, forms a whey protein digestion product. This digestion product has the unexpected property that it forms a complex with casein micelles when added to milk or a dairy liquid containing casein micelles. As a consequence of forming such a complex, renneting the digestion product-casein micelle complex provides a cheese product in which a significant fraction of the digestion product remains in the curd. In addition, formation of this complex leads to degradation of casein upon renneting and to retention of the casein digestion products in the curd. This result (i.e., that whey protein may be treated so as to be retained in cheese curd and be incorporated into a cheese product) is unexpected. It is also unexpected that retaining whey protein in the curd by the method of the invention results in high sensory quality (i.e., there are no off-flavors in the resulting cheese). Heretofore, it was known only that untreated whey protein is not incorporated into curds, and that whey protein treated, for example, by heat denaturation, shear, or foaming, has deleterious effects that include interfering with the curding process, or conferring off tastes to a curd product that results. In contrast, according to the present invention, preparation of the whey protein digestion product, using a non-rennet protease, and its incorporation into the cheese curd occurs without these effects. Namely, curding proceeds without hindrance, and taste and related organoleptic properties remain agreeable to the consumer.

The whey protein digestion product of the invention is provided by contacting whey or an aqueous suspension containing whey protein with any one of certain non-rennet proteases, under carefully specified conditions, to provide the digestion product. As described above, among the proteases that may be used are a microbial protease, a protease from plant origins, and a protease from animal or marine fish sources. Examples include the microbial proteases SP 446 (Novo Nordisk), Neutrase 1958 (Novo Nordisk), and Coralase PN-L (Rohm GmbH), and a plant protease such as papain. Preferably, the protease is the glutamyl endopeptidase (SP 446) obtained from *Bacillus licheniformis* (Novo Nordisk). The digestion procedure yields a whey protein digestion product that unexpectedly complexes with casein micelles.

The whey protein digestion product is then contacted with a dairy composition that includes casein micelles. This dairy composition may, for example, be whole milk, low fat milk, or skim milk; it may also be a reconstituted aqueous suspension of milk or a casein micelle-containing milk product; or it may be a concentrated milk obtained by procedures known to skilled artisans in dairy science and dairy technology, such as ultrafiltration and/or evaporation. The micelles form a complex with the whey protein digestion product. Upon treating the resulting dairy composition (i.e., the protein digest-casein micelle complex) with a renneting enzyme, the composition sets to a curd and supernatant whey. It is surprisingly found that the curd obtained in this fashion includes essentially all or a major proportion of the whey protein digestion product as well as casein degradation products. Thus, by incorporating all or most of the whey protein digestion product into the curd, this process advantageously optimizes the use of whey, incorporating it into a useful product rather than leaving it as a by-product of cheese production. This enhances overall cheese yields and efficiencies in the curding process. In contrast to other methods of incorporating or retaining whey proteins in the curd, the curd obtained by the instantly disclosed process has a pleasant and agreeable taste. This curd may be further processed, for example, to reduce the content of water, or by fermentation, so as to impart a particular cheese flavor and consistency.

As seen in Example 1, SDS-PAGE (FIG. 1) provides a method to follow the digestion and envision the effects of the proteolysis on the milk proteins of a cheese curd. Unexpectedly, low molecular weight degradation products arise from casein by renneting in the presence of the whey protein digestion product. These are in addition to the degradation products encompassed within the whey protein digestion products. On the other hand, it is shown that renneting after adding undigested whey protein does not lead to retention of such degradation products in the curd. Thus cheese curd resulting from the process of the present invention includes casein degradation products in addition to whey protein digestion products.

The curd described in the preceding paragraph is separated from a final whey resulting from the renneting. This whey may include unmodified whey proteins from the dairy composition employed in the formation of the protein digest-casein micelle complex described in the preceding paragraph. It may also include that proportion of the whey protein digestion product that was not incorporated into the curd, if any. If desired, this whey may be recycled to provide at least a portion of the starting whey protein employed at the outset in the method of this invention.

The casein-complexing whey protein digestion product can also be combined directly with a cheese substance such as, for example, processed cheese, cottage cheese, or cream cheese. The resulting composition provides a cheese product upon removal of the supernatant liquids remaining after the whey protein digestion product has combined by complexation with the cheese substance. The cheese product obtained advantageously optimizes utilization of whey protein in a final dairy product for greater efficiency, while providing a product with improved flavor, texture, and stability.

The following examples are provided to illustrate the invention but not to limit the invention. Unless stated otherwise, all percentage are by weight.

EXAMPLE 1

Effect of Amount of SP 446 Activity on the Preparation of Cheese Curds Containing Whey Protein Digestion Product.

Whey protein (Alacen 841, New Zealand Milk Products, Wellington, New Zealand, containing 80% protein) was dissolved in water to yield a 30% solution having a pH of about 6.5. Aliquots (4.7 g) of this solution were treated with various volumes ranging from 2.0 to 15.0 $\mu$L of Novo SP 446 protease solution (containing 1.28 units of activity/mL, where units are defined as the amount of enzyme which liberates the equivalent of one micromole of tyrosine per minute under conditions of the assay as provided by Novo Nordisk). Control samples were not treated with protease. The samples were incubated at 55° C. for 40 min; in one control, no whey protein was added and in another, whey protein was added but not heated. This treatment produced the whey protein digestion product. The sample was incubated at 77° C. for 10 min to inactivate the protease.

In order to prepare the cheese curd, 40 mL skim milk was supplemented with 62 $\mu$L of a 1:25 dilution of Cal-Sol™ (45% $CaCl_2$ from Chr. Hansen, Milwaukee, Wis.), and with 0.12 g glucono-delta-lactone, and then incubated at 31° C. for 50 min. This milk mixture (20 mL) was added to the whey protein digestion product and homogenized for 10 sec. The remaining milk was added together with 6.0 $\mu$L rennet solution (Chr. Hansen, containing 100% undiluted chymosin solution) and incubated at 31° C. for 30 min. The curd was cut in situ, and incubated with intermittent shaking as the temperature was raised from 31° C. to 39° C. over 30 min.

In order to obtain the whey protein content, the curded preparation was centrifuged at 1,500 rpm for 10 min at 25° C. The whey was decanted and both whey and curd weighed.

The protein content in the whey was determined by Kjeldahl assay. The results are presented in Table 1.

TABLE 1

Effect of increasing amounts of SP 446

| Expt. No. | Sample | Wet curd (g) | Protein in whey (g) | Protein in curd (g) | Protein Digest Retained in Curd (%) |
|---|---|---|---|---|---|
| 1 | Control[a] | 7.00 | 0.293 | (0.0)[b] | (0.0)[b] |
| 2 | WP[c], no protease, no heat | — | 1.416 | (0.0)[b] | (0.0)[b] |
| 3 | WP + 0 μL SP 446 | 11.13 | 0.701 | 0.715 | 63.6 |
| 4 | WP + 2 μL SP 446 | 10.98 | 0.700 | 0.716 | 63.8 |
| 5 | WP + 3 μL SP 446 | 11.59 | 0.646 | 0.770 | 68.6 |
| 6 | WP + 5 μL SP 446 | 11.31 | 0.653 | 0.763 | 67.9 |
| 7 | WP + 10 μL SP 446 | 11.65 | 0.631 | 0.785 | 70.0 |
| 8 | WP + 15 μL SP 446 | 11.66 | 0.633 | 0.783 | 69.8 |

[a]Control: Sample processed under standard conditions for cheddar cheese.
[b]Defined as zero.
[c]WP, whey protein added.
Results present mean of duplicate samples.

In Table 1, Experiments 1–3 present controls that account for the normal amount of whey protein that results in the absence of added digestion product. Experiment 2 (i.e., no heating or protease treatment) provides the baseline for the whey protein digestion product in the whey. Experiment 3 provides a baseline for the case in which the whey protein is heated in the absence of protease treatment. This sample corresponds to art-recognized conditions wherein whey protein is subjected to heat treatment in order to incorporate it into cheese curd. As Harper et al. discuss, these conditions result in defective cheese curds. Furthermore, Guinee et al. state that high-heat treatment of milk impairs rennet coagulation, curd syneresis, curd structure and texture, and functional properties such as meltability and stretchability. For these reasons, this sample, although containing a large proportion of whey protein, is not considered to be acceptable.

The remaining samples in Table 1, therefore, establish the inventive method and compositions of the instant disclosure. It is found that the whey protein digestion product is incorporated into cheese curds to a high extent. Moreover, and importantly, these whey protein digestion products, when incorporated into cheese products, do not exhibit the objectionable product defects reported by prior art workers. In contrast to the case in which the protease is absent, the presence of protease yields digestion products which are readily incorporated into the curds to a high extent, and produce a curd product with favorable processing characteristics, namely, an appropriate overall yield of curd and an agreeable and appetizing flavor. Objective differences in the samples with and without protease are established in an SDS-PAGE generated from samples taken from some of the experiments in Table 1, shown in FIG. 1. This Figure presents the protein composition of the curd obtained from each of these samples. Bands corresponding to casein, β-lactoglobulin, and α-lactalbumin are present in standard cheddar curd (Lane 1) and upon heat treatment of a sample that is not digested with the protease and then subjected to rennet treatment (Lane 5). It is significant that Lanes 1 and 5 contain no bands with apparent molecular weights lower than that of α-lactalbumin.

On the other hand, Lanes 2, 3, and 4 show the results obtained when the inventive method is carried out, namely, when 2 μL, 5 μL, and 10 μL, of SP 446, respectively, (i.e., samples 4, 6, and 7 in Table 1) are heated with the samples. The bands corresponding to casein, β-lactoglobulin, and α-lactalbumin are depleted to a proportionately greater extent as increasing volumes of protease are added. Progressively increasing amounts of lower molecular weight bands, having apparent molecular weights of about 2.0 kDa and about 10 kDa, corresponding to digestion products of these proteins, are present in the curds. It is expected, based on the foregoing disclosure, that the whey proteins, β-lactoglobulin, and α-lactalbumin, are degraded by the protease treatment. The additional unexpected observation, however, is that the casein is also degraded as a result of renneting the complex formed with the whey protein digestion products. That is, at least a portion of the low molecular weight degradation products visualized in Lanes 2, 3, and 4 represent degradation products of casein. These degradation products arise, at the expense of the casein originally present, upon renneting the complex formed by the whey protein digestion product and casein micelles. In contrast, renneting without having first digested the whey protein does not lead to any low molecular weight bands (Lane 5). Thus cheese curd resulting from the process of the present invention includes casein degradation products in addition to whey protein digestion products.

These experiments demonstrate that the action of a non-rennet protease on whey protein provides a digestion product which, when used in the preparation of a cheese curd, is retained to a significant extent in the cheese curd. The retention of whey protein products, retention of casein digestion products, and the use of a non-rennet protease to achieve these results, are unknown in the arts of cheese-making and dairy science. Moreover, prior art methods for producing a whey protein hydrolyzate yield a product with an unacceptable taste. The cheese curd products of the present invention, in contrast, have agreeable flavors.

EXAMPLE 2

Effect of Time of Incubation with SP 446 on the Preoaration of Cheese Curds Containing Whey Protein Digestion Product.

The effect of the length of time for which a whey protein solution is incubated with SP 446 was determined using experimental conditions similar to those described in Example 1. A 22.5% whey protein solution (4.68 g) was prepared. A fixed aliquot (4.0 μL) of SP 446 protease solution (1.28 units/mL) was added to each non-control sample, which was incubated at 67° C. for varying times after adding the enzyme. All samples, including one control, were heated for a total time (i.e., prior to and after enzyme addition) of 60 min. In a second control, whey protein was added but not heated. The cheese curd was prepared from these digestion products and assayed as described in Example 1. The results are presented in Table 2.

TABLE 2

Effect of length of incubation with SP 446.

| Expt. No. | Sample | Heating (min/min)[a] | Wet curd (g) | Protein in whey (g) | Protein in curd (g) | Protein Digest Retained in Curd (%) |
|---|---|---|---|---|---|---|
| 1 | Control[b] | 0/0 | 6.45 | 0.286 | (0.0)[c] | (0.0)[c] |
| 2 | WP[d] + 0 μL SP 446 | 0/0 | — | 1.133 | (0.0)[c] | (0.0)[c] |

TABLE 2-continued

Effect of length of incubation with SP 446.

| Expt. No. | Sample | Heating (min/min)[a] | Wet curd (g) | Protein in whey (g) | Protein in curd (g) | Protein Digest Retained in Curd (%) |
|---|---|---|---|---|---|---|
| 3 | WP + 0 μL SP 446 | 0/60 | 9.66 | 0.774 | 0.359 | 42.33 |
| 4 | WP + 4 μL SP 446 | 15/60 | 9.92 | 0.751 | 0.382 | 45.07 |
| 5 | WP + 4 μL SP 446 | 30/60 | 10.60 | 0.723 | 0.410 | 48.41 |
| 6 | WP + 4 μL SP 446 | 60/60 | 10.65 | 0.668 | 0.465 | 54.94 |

[a]Minutes heated in presence of SP 446/minutes heated total.
[b]Control: Sample processed under standard conditions for cheddar cheese.
[c]Defined as zero.
[d]WP, whey protein added.
Results present mean of duplicate samples.

In Table 2, the cheddar control (Experiment 1) is included for reference to account for the normal amount of whey protein that results in the conventional process. Another control (Experiment 2) is for the case in which whey protein is added without heating and without protease treatment, and establishes the baseline for amount of undigested whey protein in the whey. The third control in Table 2 (Experiment 3) provides a baseline for heating the whey protein in the absence of protease treatment. As described in Example 1, this sample corresponds to art-recognized conditions wherein whey protein is subjected to heat treatment in order to incorporate it into cheese curd, and that results-in defective cheese curds due to incorporation of heat denatured whey protein.

Experiments 4–6 provide the results obtained when whey protein digestion products are produced and added to the skim milk renneting process. In these experiments, the protein retained in the curds includes the casein-complexing whey protein digestion product produced as a result of the treatment by SP 446. It is seen that progressively more digestion product is retained in the curd as the incubation time increases.

These experiments corroborate the results obtained in Example 1 and demonstrate that the action of a non-rennet protease on whey protein provides a digestion product which, when introduced into a milk composition and renneted, is retained to a significant extent in the cheese curd. No off-flavors or undesirable properties were observed as a result of this incorporation of whey protein in the curds.

EXAMPLE 3

Effect of Amount of SP 446 on the Preparation of Cheese Curds Containing Whey Protein Digestion Product.

The effect of the amount of SP 446 activity added to a whey protein solution was determined using experimental conditions similar to those described in Example 1. The whey protein solution was a 22.5% solution, and the samples were incubated at 67° C. for 30 min. The cheese curd was prepared from these digestion products and assayed as described in Example 1. The results are presented in Table 3.

TABLE 3

Effect of amount of SP 446 activity added.

| Expt. No. | Sample | Wet curd (g) | Protein in whey (g) | Protein in curd (g) | Protein Digest Retained in Curd (%) |
|---|---|---|---|---|---|
| 1 | Control[a] | 6.45 | 0.286 | (0.0)[b] | (0.0)[b] |
| 2 | WP[c], no protease, no heat | — | 1.133 | (0.0)[b] | (0.0)[b] |
| 3 | WP + 0 μL SP 446 | 9.23 | 0.848 | 0.285 | 33.64 |
| 4 | WP + 1 μL SP 446 | 9.77 | 0.796 | 0.337 | 39.77 |
| 5 | WP + 2 μL SP 446 | 9.56 | 0.807 | 0.326 | 38.45 |
| 6 | WP + 6 μL SP 446 | 10.73 | 0.751 | 0.382 | 45.05 |
| 7 | WP + 10 μL SP 446 | 10.85 | 0.737 | 0.396 | 46.71 |
| 8 | WP + 15 μL SP 446 | 10.66 | 0.728 | 0.405 | 47.82 |

[a]Control: Sample processed under standard conditions for cheddar cheese.
[b]Defined as zero.
[c]WP, whey protein added.
Results present mean of triplicate samples.

In Table 3, the cheddar control (Experiment 1) is included to characterize results obtained in a conventional cheese-making process. The second control (Experiment 2) establishes a baseline for appearance of the added whey protein in the whey liquid produced without heating and without protease treatment. The third control (Experiment 3) provides a baseline for the case in which the whey protein is heated in the absence of protease treatment, and corresponds to art-recognized conditions that are known to result in defective cheese curds.

Experiments 4–8 were obtained using the process of the invention. In these experiments the protein retained in the curds is the casein-complexing whey protein digestion product produced as a result of the treatment by SP 446. Progressively more digestion product is retained in the curd as the SP 446 activity increases.

These experiments corroborate the results obtained in Examples 1 and 2, demonstrating that the action of a non-rennet protease on whey protein provides a digestion product which, when incorporated into a cheese curd, is retained to a significant extent in the cheese curd. Again, no off-flavors or other undesirable properties were observed from curds obtained with the process of the invention.

EXAMPLE 4

Large Scale Preparation of Cheese Curds Containing Whey Protein Digestion Product.

This example provides a large scale preparation of cheese curds of the invention, incorporating the whey protein digestion product. Conditions similar to that of commercial cheese production processes were employed. The whey protein digestion product was prepared as follows:

(A) 0.500 kg of whey protein (Alacen 841, New Zealand Milk Products; 80% protein) was dissolved in 2.000 kg of water at 60° C.;

(B) 3.0 mL of protease NOVO SP 446 (1.28 units/mL) was added to the whey protein solution, and incubated at 63° C. for 4 h;

(C) The digested protein sample was heated at 80° C. for 30 min, and cooled to room temperature; and (D) The whey protein digestion product was stored in a cold room until used in the cheese making process.

The cheese curd incorporating the whey protein digestion product was prepared as follows:

(A') 10 kg of milk was heated in a paddle tank to 31° C.;

(B') 0.624 mL of Cal-sol™ (45% $CaCl_2$ from Chr. Hansen, Milwaukee, Wis.), a source of $Ca^{+2}$, was added during the heating in (A');

(C') 1.2125 g of culture (CH-N22 frozen lactic culture, Mesophilic aromatic culture, type A, Chr. Hansen, Horsholm, Denmark) was added to the milk when it reached 31° C., and was incubated for 30 min;

(D') About 1/10 of the milk sample was mixed with 1 120 g of the whey protein digestion product and homogenized; in a control sample no digestion product was added;

(E') The digestion product homogenized with the milk was added back to the rest of the milk;

(F') 1.10 mL of chymosin (100% undiluted rennet, Chr. Hansen, Milwaukee, Wis.) was added to the milk mixture and incubated at 31° C. for 30 min, resulting in curd formation, and the curd was cut;

(G') The temperature was increased from 31° C. to 38–39° C. over a 30 min time span;

(H') The whey was drained off for 1–2 h;

(I') The curd was mixed with 30 g salt, and pressed overnight;

(J') The curd was weighed, cut and vacuum sealed, and placed in an aging room.

The weight of cheese curd obtained from this process was 1.752 kg, whereas the control sample, which omitted addition of whey protein digestion product (see step D'), provided 1.074 kg.

Figure 2:
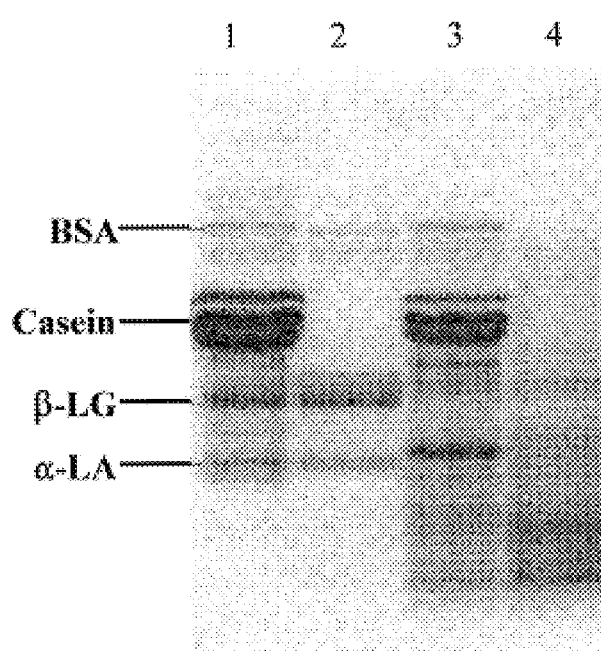
FIG. 2 presents a tricine buffer SDS-PAGE providing the results obtained with a large scale production run incorporating the whey protein digestion product into cheese curd according to the process of the present invention. Lane 1, milk employed in preparing the curd of the process; lane 2, whey recovered from the process; lane 3, curd produced by the process; and lane 4, whey protein digestion product of the process, employed in preparing the curd shown in lane 3.

The raw materials and products developed in the above process were subjected to analysis by SDS-PAGE in a tricine buffer. The results are shown in FIG. 2. Lane 1 shows the proteins present in the milk used to prepare the cheese curds, and Lane 4 shows the peptides present in the whey protein digestion product prepared using steps A–D. It is seen in lane 4 that the principal proteins found in whey, β-lactoglobulin, and α-lactalbumin, which are also present in milk (see lanes 2 and 1, respectively), are absent in the digestion product. In Their place is seen a broad distribution of low molecular weight peptides, having molecular weights lower than that of α-lactalbumin, representing the whey protein digestion products. Lane 3 presents the protein and peptide content of the cheese curd obtained in step I', and lane 2 shows the proteins present in the whey obtained from the process in step H'. The proteins found in the whey fraction clearly arise from the milk employed, for the proteins seen, β-lactoglobulin, and α-lactalbumin, are found in milk (lane 1). Since no evidence of undigested β-lactoglobulin, and α-lactalbumin is seen in the whey protein digestion product employed (lane 4) the β-lactoglobulin, and α-lactalbumin in the whey could not have originated from the digestion product. Significantly, the curd (lane 3) contains essentially all the low molecular weight peptides introduced into the process from the whey protein digestion product (lane 4), whereas the whey (lane 2) exhibits no evidence of such peptides. Additionally, a prominent band appears in the curd (lane 3) at a molecular weight slightly higher than that of α-lactalbumin. Since this band does not appear in milk (lane 1), it is believed that it represents a digestion product of casein.

It is concluded from this experiment that cheese curds prepared by the process of the present invention, when run on a large scale, incorporate essentially all the whey protein digestion product introduced into the process. Additionally, the curd includes an additional polypeptide believed to be a digestion product of casein. The scaled up process used in this example is similar to that which would be used in a commercial implementation of the present invention. Since the cheese curds incorporating whey protein digestion product contain some low molecular weight polypeptides, as shown from the SDS-PAGE results in FIG. 2, a faster rate of aging could be expected. This provides an additional favorable property of the methods and compositions of the invention.

We claim:

1. A method of making a cheese composition that contains a whey protein digestion product, the method comprising the steps of:

(i) providing a first composition comprising whey protein;

(ii) contacting the first composition with a non-rennet protease and incubating at a temperature of about 20 to about 70° C. for about 10 to about 300 minutes to provide a casein-complexing whey protein digestion product, wherein the casein-complexing whey protein digestion product is not heat-denatured;

(iii) contacting the digestion product with a second composition comprising casein micelles to provide a complex of the digestion product and the casein micelles; and (iv) rennetting the complex; thereby providing the cheese composition that comprises whey protein digestion products and that further comprises casein degradation products, wherein the non-rennet protease is a microbial protease that is the bacterial protease isolated from Bacillus licheniformis that is a serine protease specific for glutamic acid and aspartic acid residues having an apparent molecular weight of about 23,600 Da.

2. The cheese composition of claim, 1, wherein the composition and the non-rennet protease are incubated for about 30 to about 60 minutes.

3. The cheese composition of claim 2, wherein the pH during incubation is about 4.5 to about 10.0.

4. The cheese composition of claim 3, wherein the pH during incubation is about 5.5 to about 9.0.

* * * * *